United States Patent [19]
Isaacs

[11] 3,782,746
[45] Jan. 1, 1974

[54] SELF-SUPPORTING NESTING CART

[76] Inventor: Harold Isaacs, 2583 Fenwick Rd., University Heights, Ohio 44118

[22] Filed: Dec. 30, 1971

[21] Appl. No.: 214,263

[52] U.S. Cl............................ 280/33.99 H, 280/79.3
[51] Int. Cl.............................................. B60r 27/00
[58] Field of Search............... 280/33.99 T, 33.99 S, 280/33.99 H, 33.99 F, 33.99 A, 33.99 R, 47.34, 47.35, 79.1, 79.2, 79.3

[56] References Cited
UNITED STATES PATENTS

| 3,027,174 | 3/1962 | Garbarino | 280/33.99 H |
| 3,240,505 | 3/1966 | Schlernitzauer | 280/79.3 X |
| 2,992,010 | 7/1961 | Sides | 280/33.99 S |
| 3,462,166 | 8/1969 | Fuhrmann | 280/33.99 S |
| 3,522,954 | 8/1970 | Locke | 280/33.99 T |

FOREIGN PATENTS OR APPLICATIONS

| 850,841 | 9/1952 | Germany | 280/79.3 |
| 710,420 | 9/1941 | Germany | 280/79.3 |

Primary Examiner—Kenneth H. Betts
Assistant Examiner—Milton L. Smith
Attorney—Edward E. Sachs

[57] ABSTRACT

A four wheel cart with a narrow horizontally extending frame connecting the running gear and serving as a support for split shelves hinged to the end frame. A vertical spacer is disposed between the running gear and the horizontal frame to permit nesting of two or more carts when the shelves are in an upright position.

42 Claims, 10 Drawing Figures

SELF-SUPPORTING NESTING CART

This invention relates generally to a movable cart adapted to be employed in warehouses and particularly in the food distribution industry and, more particularly, to a self-supporting cart which can be nested into a cart of identical configuration for the purpose of saving floor space.

The term "nesting" as used herein denotes that the cart has the capability of being compactly fit into or within another cart of the same type. The term "self supporting" further defines the class of carts under consideration and is intended to describe carts whose base structure is such that it does not require any internal modification or external support for the cart to be free standing, with or without a load.

In the general prior art to which this invention pertains, it is already known to utilize carts in the food distribution industry which are foldable, or collapsible in some manner, to save floor space either when these carts are stored in the warehouse or are transported empty on a truck. Conventionally, these carts have a total running gear of four wheels. In order to obtain such space saving, carts have been suggested in which the end frames are folded so that the cart can be vertically stacked. In other designs, the end frames are hinged in such a manner that they can be folded sideways either together with the running gear or in which the running gear is folded in a separate step. The folded carts of the latter category, while quite compact, are generally unable to stand unsupported due to the displacement of the running gear.

The folding of the main frame members as well as the displacement of the running gear presents innumerable problems. It has already been mentioned that such carts are unstable and do not have the ability to be self-supporting and thus must be leaned against a support or some other abutment. Inasmuch as the running gear has been displaced, the folded carts of the latter type, cannot be moved about such running gear as one pair of wheels is conventionally displaced 90° relative to the other pair. In order to obviate such shortcomings, it has become the practice to fold such carts only partially. However, it will be appreciated that such half-folded carts do at least partly surrender the advantages that are desired.

It is therefore the primary object of this invention to provide a cart which can be stored with like carts in a compacted manner without the need for folding any of the main frame members and without folding or otherwise affecting the running gear.

It is therefore another primary object of the present invention to provide a cart which is constructed in such a manner so as to be able to nest with like carts for space-saving purposes.

It is another object of the present invention to provide a cart of the type described above in which the nesting is accomplished without changing the position of the wheels relative to the main frame members.

It is another object of the invention to provide a cart which is structurally as stable and as self-supporting during a nested condition as in its un-nested condition.

It is another object of the present invention to provide a cart in which the nesting step can be accomplished in a very simple manner and in comparative safety.

It is a still further object of the present invention to provide a nesting cart in which none of the main frame members is hinged in any manner. This is of particular importance inasmuch as the prior art carts require numerous hinging points and more often than not, when one of the hinging points becomes inoperative, the whole folding operation of the cart becomes impossible.

It is still another object of the present invention to provide a nesting cart which utilizes one or more hinged shelves, with the shelves being the only members that have to be moved for nesting.

These and other objects of the present invention are accomplished by providing a self-supporting combination end and side nesting cart which comprises a front as well as a longitudinally spaced rear wheel running gear and a support for each of such running gear. A structural network is mounted in vertically spaced relation to the top main surface of the support. The network includes two vertically extending and horizontally spaced end frame means and a rigidly horizontally extending connection bridging both of the supports for the running gear. The bridging connection has a transverse width which is not appreciably greater than the width required for the bridging connection to function as a structural support for the above mentioned network. A spacer is vertically interposed between the main surface of each support means and the bridging connection.

Another aspect of the present invention resides in the provision of a cart of the type described in the preceding paragraph in which a shelf is hingedly secured to one end frame means and is adapted to bear in an upright position against the end frame means and in a horizontal position against the above mentioned bridging connection.

A still further aspect of the present invention resides in the cart as above described in which there is provided a second bridging connection extending parallel to but vertically spaced from the first mentioned bridging connection, with the vertical location being located either intermediate between the vertical ends of the end frame means or at or above the extreme upper end thereof.

A further aspect of the present invention resides in providing a nesting cart of the type described above, in which each end frame means includes a centrally located main frame post and two corner posts connected to the frame post by rungs, with the corner posts having vertically extending discontinuities.

For a better understanding of the present invention, together with other and further objects thereof, reference is had to the following description taken in connection with the accompanying drawings, and its scope will be pointed out in the appended claims.

Figure 1:
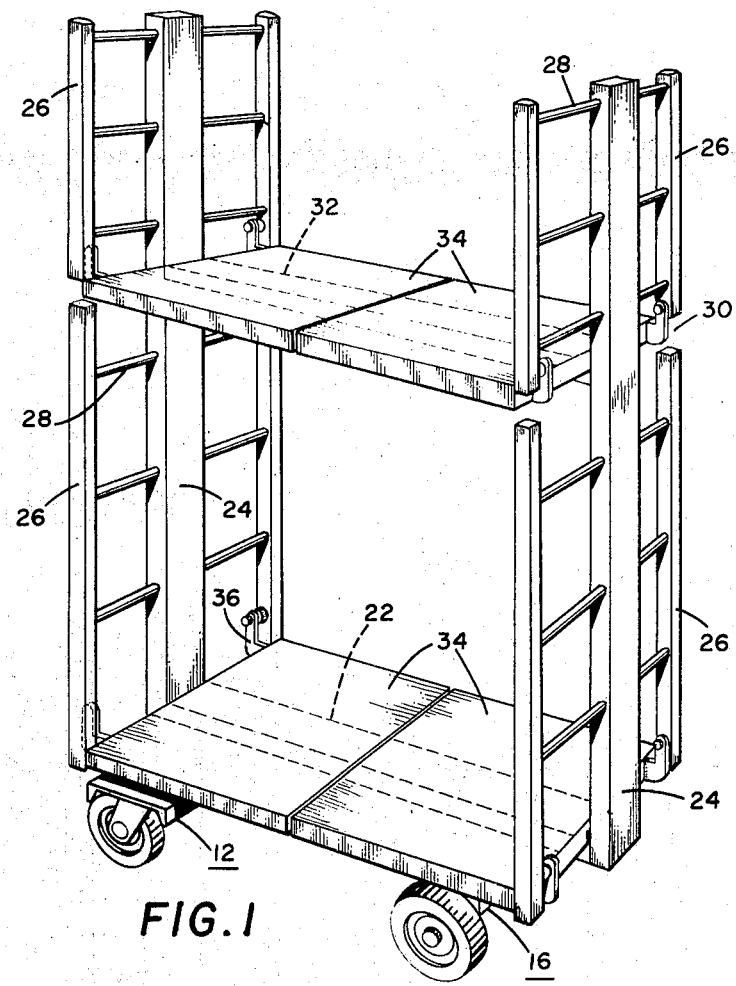
FIG. 1 is a perspective view of a nesting cart in accordance with the present invention.

Referring now to the drawings and, more specifically, to FIGS. 1 to 5, there is shown a cart 10, having a conventional running gear 12,16, with the forward running gear 12 comprising a pair of swivel mounted wheels 13 secured to a transversely expanding support channel 14. The gear running gear 16 comprises two fixed wheels 17 connected by a suitable axle 18 with a transversely extending support 20, secured to the axle. The top surface 20a of support 20 being co-planar to the top surface 14a of the front or forward support 14 for the running gear 12.

A structural network which constitutes the main frame of the cart is mounted in vertically spaced relationship to the top main surfaces 14a and 20a of each of the running gears.

In the preferred embodiment, the structural network comprises two vertically extending and horizontally spaced end frame arrangements and a rigid horizontally extending connection bridging the support surfaces 14a and 20a in vertically spaced relation as hereinafter further described.

The bridging connection is constituted by a relatively narrow horizontally arranged main frame member 22 which has a transverse width which is not appreciably greater than that required to function as the structural support for the aforementioned network. Normally, the transverse width will be held to an absolute minimum dimension in order to obtain the optimum benefit of the present invention. Therefore, the transverse width of the frame member 22 should be a fraction of the length (parallel to axle 18) of the support surfaces 14a, 20a or, conversely, the length of the running gear along its axis should be a multiple dimension of the corresponding transverse width of this bridging connection. The horizontal main frame member 22 which constitutes the bridging connection is arranged with its longitudinal axis substantially perpendicular to the axis of each of the running gear and proximate to the intermediate center of the latter so that the transverse distance between one side of the bridging connection and the next adjacent wheel is at least equal to the transverse dimension of the bridging connection.

Figure 7:
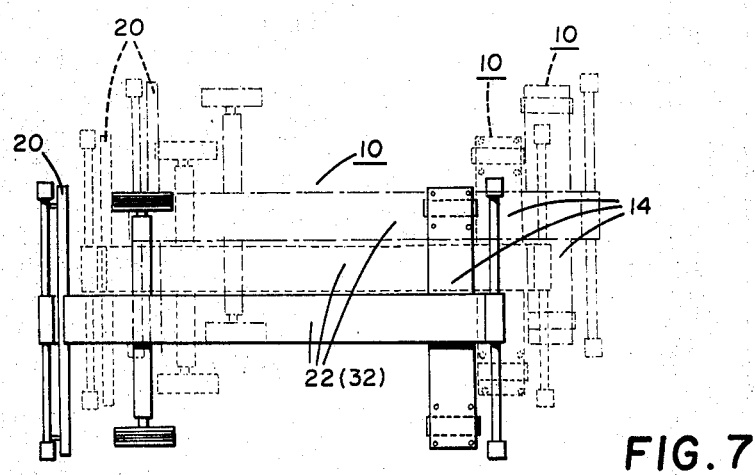
FIG. 7 is a diagrammatic plan view showing three nesting carts in nesting position.

These geometric relationships between the running gear and the horizontal main frame member 22 of the bridging connection are best understood when reference is made to FIG. 7 wherein there are shown several nesting carts 10 with their main frame members 22 in abutting relationship, with at least two main frame members 22 fitting between a pair of wheels of one running gear.

The horizontally spaced end frame of the structural network includes a centrally located main frame post 24 which at its bottom is placed in juxtaposition to the horizontal main frame member 22 and from that location extends vertically upward. The connection between the main horizontal frame member 22 and the main end frame member 24 can be obtained by simply welding these two members together.

The two end frames can be provided, in addition to the main frame member 24, with vertically extending corner posts 26 which are connected to the central end frame members 24 by means of a plurality of horizontally extending rungs 28. Each of the corner posts 26 has a discontinuity or gap 30 between its ends, for purposes which will hereafter become more apparent.

A second bridging connection in the form of a horizontally extending frame member 32 is provided which extends parallel to but vertically spaced from the bridging connection 22. In the preferred embodiment, the second bridging connection 32 is located intermediate to the vertical ends of each of the two end frames 24,26 and is located vertically in substantial alignment with the gap or discontinuity 30, of each corner post. The vertical dimension of the gap 30 is greater than the depth of the bridging connection 32 and is located to bridge the vertical dimension of the main frame member 32. The main frame member 32 structurally connects the main frame posts 24.

Figure 3:
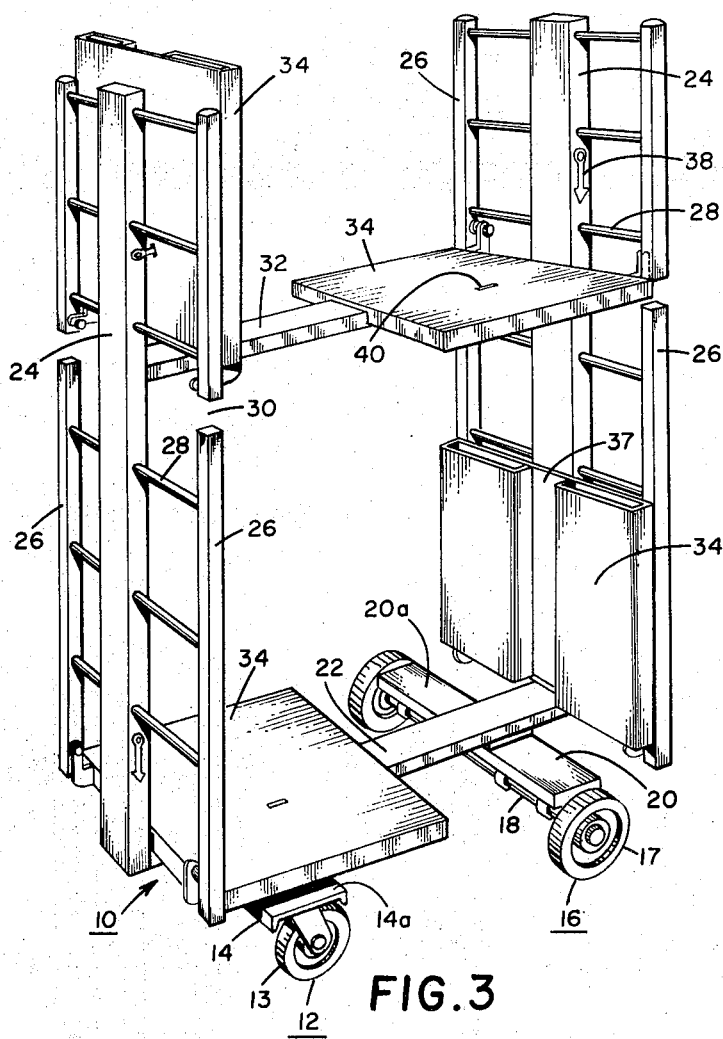
FIG. 3 is a perspective view of the nesting cart similar to FIG. 1 showing two of the split shelves in an upright position.
Figure 5:
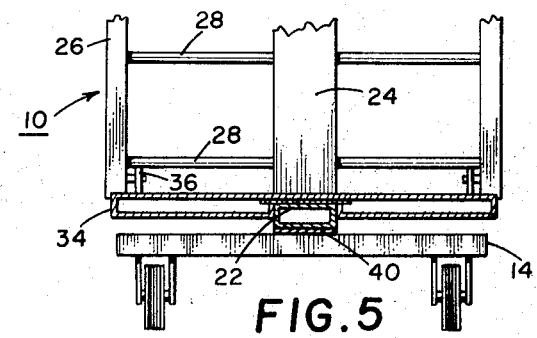
FIG. 5 is a fragmentary end view, similar to FIG. 4, showing the bottom portion thereof partly in section.
Figure 4:
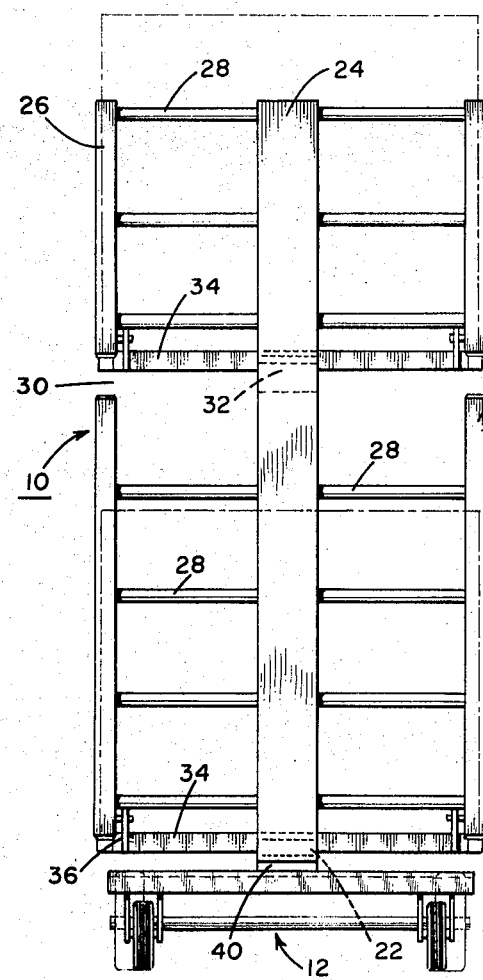
FIG. 4 is an end view of the cart shown in FIGS. 1 to 3 with the shelves in a horizontal position.
Figure 5A:
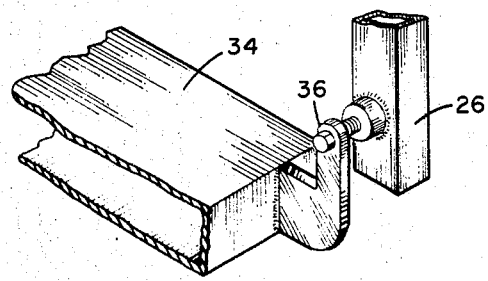
FIG. 5a is a fragmentary perspective view similar to FIG. 3, showing an enlarged portion of the hinging mechanism between a corner post and a shelf.
Figure 9:
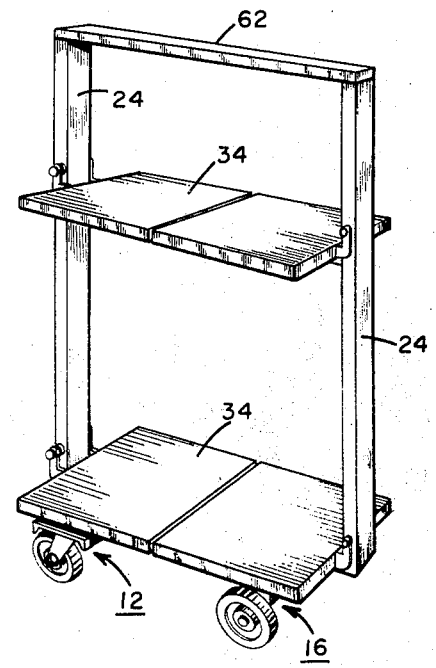
FIG. 9 is a perspective view of still another modified cart in accordance with the present invention.

To each end frame, either to the corner posts 26 as shown in FIG. 3 or to the main frame 24 as shown in FIG. 9, there is hingedly secured two vertically spaced pairs of shelves 34 each by means of a hinging mechanism 36 inter-connecting each shelf 34 to, for example, two corner posts 26 of an end frame, see FIG. 5a. Each pair of shelves forms in a horizontal position a single substantially continuous surface, with each individual shelf being adapted to bear in an upright position against an end frame post while in the aforementioned horizontal position the elevated shelves bear against the horizontally extending frame member 32, while the lower shelf members bear against the horizontally extending frame member 22.

In order to obtain maximum cubic space within the cart, the bottom of each shelf is provided with a recess 37 along its longitudinal dimension and when the shelf is in the horizontal position it is telescoped over part of the main frame members 22, 32, see FIGS. 3 and 5.

In order to permit nesting of the cart with other carts, it is essential that the upper shelves are arranged on the corner posts in such a manner that the bottom surface of each shelf is above the discontinuity 30, so as not to interfere with the gap. Each of the four shelves is retained, in the upright position, by means of a latch 38 shown in FIG. 3. A suitable opening 40 is provided in each shelf to receive and retain the latch 38 which is pivotably secured to the main vertical frame 24. The above described preferred embodiment discloses split shelves which can be readily moved from a horizontal to an upright position or vice versa.

Finally, in order to facilitate the nesting of like carts, it is essential that the structural network and those members secured to the network, be vertically spaced relative to the support surfaces 14a and 20a of the running gear. In order to facilitate such spacing there is interposed a spacer which is preferably of a horizontal dimension encompassing only the contact area or the area of juxtaposition of the horizontal main frame member 22 and the support surfaces 14a and 20a. The spacer 40, see FIG. 5, must be of a dimension to permit the running gear, including the support surfaces thereof, of a second nesting cart to be rolled under the horizontal main frame member 22. Ordinarily, the diameter of the wheels 12 or 16 will not exceed the vertical height of the top surfaces 14a or 20a. However, if and when such diameter does exceed the height of these support surfaces, it is essential that the spacer 40 be vertically dimensioned to permit such running gear to move underneath the horizontally extending main frame member 22. It will be appreciated by those skilled in the art that without such spacer 40 the present invention becomes inoperative and its usefulness is then simply that of conventional carts.

Figure 2:
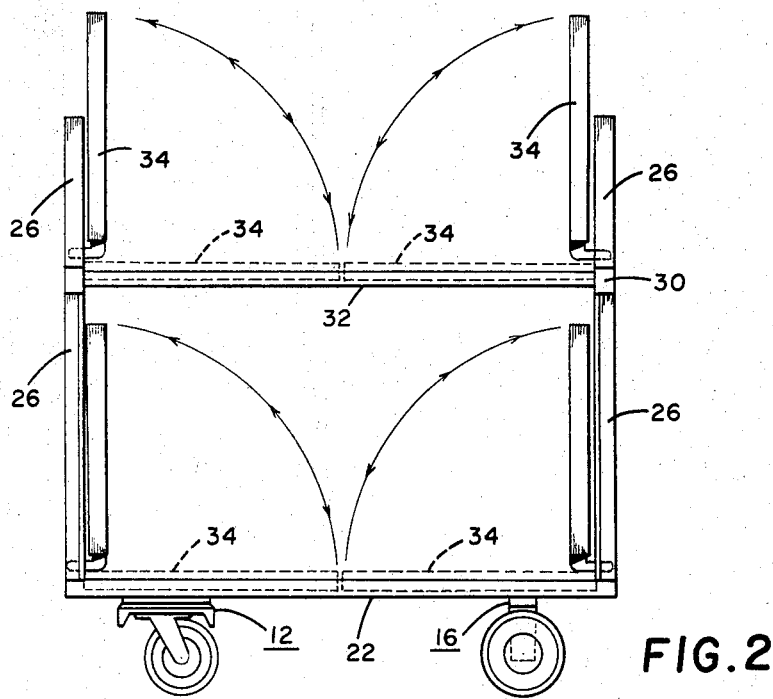
FIG. 2 is a side view of the nesting cart with the shelves shown in an upright position.
Figure 6:
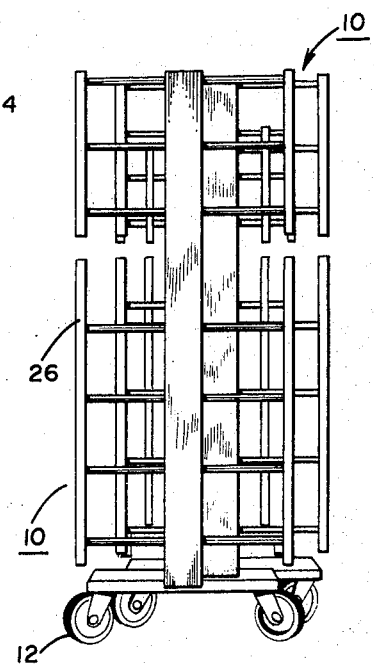
FIG. 6 is a perspective end view of two nesting carts of the type shown in FIG. 1, in nesting position.

In order to nest two or more carts, it is first necessary to move the shelves 34 to an upright position, as shown in FIG. 2. Thereafter, the carts can be moved into nesting position by rolling the running gear of one first cart under the horizontal main frame member 22 of the second cart while, more or less simultaneously, the horizontal main frame member 32 of the first cart passes through the gaps 30, until the horizontal main frame members 22 and 32 of each of the two carts are in a parallel and abutting position, as shown in FIGS. 6 and 7. It will therefore be appreciated that the bottom elevation of the upper shelves 34 must be above the gaps 30 in the corner posts. Similarly, the bottom end of the corner posts 26 may not extend below the top surface of the main frame member 22 as, otherwise, an interference is established which obstructs the movement of the main frame member 22 towards the above noted abutting relationship.

The nesting of the carts may be accomplished with a variety of nesting patterns, only one of which is shown in FIG. 7.

Figure 8:
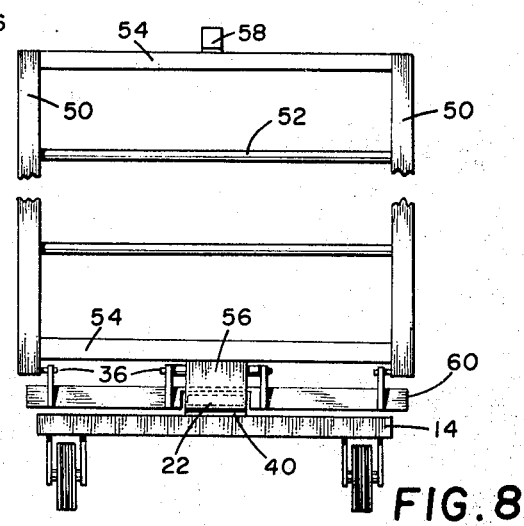
FIG. 8 is an end view of a modified cart.

The present invention, and particularly the structural network, may be adapted to various modifications. In FIG. 8 there is shown a cart in which the running gear and the horizontally extending main frame member are constructed and arranged substantially as above described. However, each of the two spaced end frames is composed of two continuous corner posts 50 with such corner posts being connected by means of transversely extending rungs 52 and at the extreme top and bottom by means of structural members 54. Each end frame composed of members 50, 52 and 54 is vertically spaced relative to the running gear supports 14 and 20 by means of a short section of a vertically extending main frame post 56. In order to enhance the structural rigidity of the two end frames, a bridging connection is provided above the upper structural member 54 in the form of a horizontally extending frame member 58. The lower bridging connection is constructed and arranged in the same manner as described above with regard to member 22. A shelf 60 is hingedly secured to either the short frame section 56 and/or to the corner posts 50 by means of a mechanism 36, as shown in FIG. 5a. The shelf 60 differs from the shelves described above in that the shelf 60 encompasses the entire longitudinal length between the two end frames (only one of which is shown). For nesting purposes, it is, of course, necessary that the shelf 60 be placed in an upright position and in order to accomplish such movement the upper bridging connection 58 must be located out of the path of such movement. With this modification, a second shelf may be arranged (not shown) at a higher elevation. Such shelf is secured in the same manner as shelf 60 except that provision has to be made for the shelf to be moved from the horizontal position to a downward position. At the unhinged end of the upper shelf, the shelf is supported by means of movable brackets, not shown.

In the modification shown in FIG. 9, shelves 34 are hinged to the main frame post 24 in order to obviate the need for rungs and corner posts. The need for rungs and corner posts depends upon the type of merchandise to be used. In order to enhance the structural rigidity of this modified embodiment, there is provided a third bridging connection in the form of a horizontally extending main frame member 62 connecting to and between the main posts 24.

It is obvious that various combinations of the essentially three embodiments may be achieved and still fall within the spirit of the invention.

Therefore, while there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A self-supporting combination end and side nesting cart, comprising:
 a front and a longitudinally spaced rear wheel type running gear, and rigid support means for each thereof;
 a structural network mounted in vertically spaced relation to the top main surface of each said support means, said network comprising two vertically extending and horizontally spaced end frame means and a rigid horizontally extending connection bridging both of said support means, said bridging connection having a transverse width not appreciably greater than that required to function as a structural support for said network;
 a spacer engaging and vertically interposed between said main surface of each said support means and said bridging connection;
 the length of at least one running gear along its wheel axis being a multiple dimension of the corresponding transverse width of said bridging connection; each support means projecting laterally of both sides of the bridging connection whereby when one cart is nested with another cart, the bridging connection of one cart will overlay and be spaced from one support means of the other cart with said support means being positioned between both support means of the other cart;
 a shelf hingedly arranged on each of the two end frame means and adapted to bear in an upright position against the end frame means and in a horizontal position against said first mentioned bridging connection to establish two shelves in a horizontal position having a substantially continuous plane.

2. A self-supporting nesting cart according to claim 1, wherein said bridging connection is arranged with its longitudinal axis substantially perpendicular to the axis of each said running gear and proximate to the center of the latter.

3. A self-supporting nesting cart according to claim 2, wherein the transverse distance between said bridging connection and one wheel of one running gear is at least equal to the transverse dimension of said bridging connection.

4. A self-supporting nesting cart according to claim 1, wherein the bottom of each shelf is recessed along its longitudinal dimension and in said horizontal position is telescoped over part of said bridging connection.

5. A self-supporting nesting cart according to claim 1, and a second bridging connection extending parallel to but vertically spaced from the first mentioned bridging connection.

6. A self-supporting nesting cart according to claim 5, wherein said second bridging connection is located at substantially the extreme upper end of or above each end frame means.

7. A self-supporting nesting cart according to claim 5, wherein said second bridging connection is located intermediate to the vertical ends of each of the frame means.

8. A self-supporting nesting cart according to claim 5, including a pair of shelves hingedly secured to each of said two end frame means and adapted to bear in an upright position against the common end frame means and in a horizontal position one of each said pair of shelves bearing against said first mentioned bridging connection and the other of each said pair of shelves bearing against said second bridging connection, to establish two vertically spaced substantially continuous shelves.

9. A self-supporting nesting cart according to claim 8, wherein the bottom of each shelf is recessed along its longitudinal dimension and in said horizontal position is telescoped over part of said bridging connection.

10. A self-supporting nesting cart according to claim 1, wherein each end frame means consists of a single centrally located frame post connected to said connection.

11. A self-supporting nesting cart according to claim 10, wherein the bottom of each main frame post terminates above the main surface of said support means.

12. A self-supporting nesting cart according to claim 1, wherein each end frame means comprises vertically extending corner posts and structural means interconnecting the corner posts.

13. A self-supporting nesting cart according to claim 12, wherein said structural means includes a centrally located vertically extending main frame post and horizontally extending rungs, and wherein each corner post has a common vertically extending discontinuity.

14. A self-supporting nesting cart according to claim 13, and a second bridging connection extending parallel to but vertically spaced from the first mentioned connection.

15. A self-supporting nesting cart according to claim 14, wherein said discontinuity is located in alignment to the heights of said second bridging connection and the vertical dimension of said discontinuity exceeds the corresponding dimension of said second bridging connection.

16. A self-supporting nesting cart according to claim 14, including a pair of shelves hingedly secured to each of said two end frame means and adapted to bear in an upright position against the common end frame means and in a horizontal position one of each said pair of shelves bearing against said first mentioned bridging connection and the other of each said pair of shelves bearing against said second bridging connection, to establish two vertically spaced substantially continuous shelves and wherein the shelves adapted for bearing against said second bridging connection are arranged in said upright position with their bottom ends above said discontinuity.

17. A self-supporting nesting cart according to claim 12, wherein the bottom of each corner post terminates above the main surface of said support means.

18. A self-supporting nesting cart according to claim 1, and latch means on said frame means for maintaining said shelves in an upright position.

19. A self-supporting combination end and side nesting cart according to claim 1, wherein the top of the support means for the front and the rear running gear are of substantially the same elevation.

20. A self-supporting combination end and side nesting cart according to claim 19, wherein the length of the support means of the front and the rear running gear are substantially the same.

21. A self-supporting combination end and side nesting cart according to claim 1, wherein the length of the support means of the front and the rear running gear are substantially the same.

22. A self-supporting combination end and side nesting cart according to claim 1, wherein the rotational axis of the hinging pivot is transverse to the length of the cart.

23. A self-supporting combination end and side nesting cart, comprising:
 a front and a longitudinally spaced rear wheel type running gear, and support means for each thereof;
 a structural network mounted in vertically spaced relation to the top main surface of each said support means, said network comprising two vertically extending and horizontally spaced end frame means and a rigid horizontally extending connection bridging both of said support means, said bridging connection having a transverse width not appreciably greater than that required to function as a structural support for said network;
 the length of at least one running gear along its wheel axis having a multiple dimension of the corresponding transverse width of said bridging connection;
 a spacer engaging and vertically interposed between said main surface of each said support means and said bridging connection; each support means projecting laterally of both sides of the bridging connection whereby when one cart is nested with another cart, the bridging connection of one cart will overlay and be spaced from one support means of the other cart with said support means being positioned between both support means of the other cart;
 and a shelf hingedly secured to one end frame means and adapted to bear in an upright position against the end frame means and in a horizontal position against said first mentioned bridging connection, the bottom of the shelf being recessed along its longitudinal dimension and in said horizontal position being telescoped over part of said bridging connection.

24. A self-supporting combination end and side nesting cart, comprising:
 a front and a longitudinally spaced rear wheel type running gear, and support means for each thereof;
 a structural network mounted in vertically spaced relation to the top main surface of each said support means, said network comprising two vertically extending and horizontally spaced end frame means and a rigid horizontally extending connection bridging both of said support means, said bridging connection having a transverse width not appreciably greater than that required to function as a structural support for said network;

the length of at least one running gear along its wheel axis having a multiple dimension of the corresponding transverse width of said bridging connection;

a spacer engaging and vertically interposed between said main surface of each said support means and said bridging connection; each support means projecting laterally of both sides of the bridging connection whereby when one cart is nested with another cart, the bridging connection of one cart will overlay and be spaced from one support menas of the other cart with said support means being positioned between both support means of the other cart;

each end frame means comprising vertically extending corner posts each having a common vertical discontinuity, a centrally located vertically extending main frame post and horizontally extending rungs connecting said corner posts and main frame post at each said end.

25. A self-supporting nesting cart according to claim 24, and a shelf hingedly secured to one end frame means and adapted to bear in an upright position against the end frame means and in a horizontal position against said first mentioned bridging connection.

26. A self-supporting nesting cart according to claim 25, wherein a shelf is hingedly arranged on each of the two end frame means.

27. A self-supporting nesting cart according to claim 26, wherein the two shelves in their horizontal position form a substantially continuous plane.

28. A self-supporting nesting cart according to claim 25, wherein the bottom of each shelf is recessed along its longitudinal dimension and in said horizontal position is telescoped over part of said bridging connection.

29. A self-supporting nesting cart according to claim 24, wherein said bridging connection is arranged with its longitudinal axis substantially perpendicular to the axis of each said running gear and proximate to the center of the latter.

30. A self-supporting nesting cart according to claim 29, wherein the transverse distance between said bridging connection and one wheel of said running gear is at least equal to the transverse dimension of said bridging connection.

31. A self-supporting nesting cart according to claim 24, and a second bridging connection extending parallel to but vertically spaced from the first mentioned bridging connection.

32. A self-supporting nesting cart according to claim 31, wherein said second bridging connection is located at substantially the extreme upper end of or above each end frame means.

33. A self-supporting nesting cart according to claim 31, wherein said second bridging connection is located intermediate to the vertical ends of each of the frame means.

34. A self-supporting nesting cart according to claim 31, and a pair of shelves hingedly secured to each of said two frame means and adapted to bear in an upright position against the common end frame means and in a horizontal position one of each said pair of shelves bearing against said first mentioned bridging connection and the other of each said pair of shelves bearing against said second bridging connection, to establish two vertically spaced substantially continuous shelves.

35. A self-supporting nesting cart according to claim 34, and latch means on said frame means for maintaining said shelves in an upright position.

36. A self-supporting nesting cart according to claim 31, wherein said discontinuity is located substantially in alignment to the heights of said second bridging connection and the vertical dimension of said discontinuity exceeds the corresponding dimension of said second bridging connection.

37. A self-supporting nesting cart according to claim 24, and a shelf hingedly secured to said corner posts and adapted to bear in an upright position against said corner posts and in a horizontal position against said first bridging connection.

38. A self-supporting combination end and side nesting cart according to claim 24, wherein the top of the support means for the front and the rear running gear are of substantially the same elevation.

39. A self-supporting combination end and side nesting cart according to claim 38, wherein the length of the support means of the front and the rear running gear are substantially the same.

40. A self-supporting combination end and side nesting cart according to claim 24, wherein the length of the support means of the front and the rear running gear are substantially the same.

41. A self-supporting combination end and side nesting cart according to claim 24, wherein the rotational axis of the hinging pivot is transverse to the length of the cart.

42. A self-supporting combination end and side nesting cart, comprising:

a front and a longitudinally spaced rear wheel type running gear, and rigid support means for each thereof, the top of said support means for the front and the rear of said running gear being of substantially the same length and elevation;

a structural network mounted in vertically spaced relation to the top main surface of each said support means, said network comprising two vertically extending and horizontally spaced end frame means and a rigid horizontally extending connection bridging both of said support means, said bridging connection having a transverse width not appreciably greater than that required to function as a structural support for said network;

a spacer engaging and vertically interposed between said main surface of each said support means and said bridging connection;

the length of at least one running gear along its wheel axis being a multiple dimension of the corresponding transverse width of said bridging connection; each support means projecting laterally of both sides of the bridging connection whereby when one cart is nested with another cart, the bridging connection of one cart will overlay and be spaced from one support means of the other cart with said support means being positioned between both support means of the other cart;

a shelf hingedly secured to one end frame means and adapted to bear in an upright position against the end frame means and in a horizontal position against said bridging connection.

* * * * *